US012233823B2

(12) United States Patent
Lyons

(10) Patent No.: US 12,233,823 B2
(45) Date of Patent: Feb. 25, 2025

(54) REDUCING OBSTRUCTION

(71) Applicant: International Engine Intellectual Property Company, LLC, Lisle, IL (US)

(72) Inventor: Timothy M. Lyons, Batavia, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 450 days.

(21) Appl. No.: 17/858,853

(22) Filed: Jul. 6, 2022

(65) Prior Publication Data

US 2024/0010170 A1    Jan. 11, 2024

(51) Int. Cl.
*B60S 1/56*    (2006.01)
*B60S 1/54*    (2006.01)
*B60S 1/66*    (2006.01)

(52) U.S. Cl.
CPC . *B60S 1/56* (2013.01); *B60S 1/66* (2013.01); *B60S 1/54* (2013.01)

(58) Field of Classification Search
CPC ...... B60S 1/56; B60S 1/66; B60S 1/54; G01S 7/4043; G01S 2007/4977; G01S 7/4813; G01S 17/931; G02B 27/0006
See application file for complete search history.

(56) References Cited

U.S. PATENT DOCUMENTS

| | | |
|---|---|---|
| 4,393,650 A | 7/1983 | Pool |
| 4,516,745 A | 5/1985 | Ely et al. |
| 5,179,470 A | 1/1993 | Olson |

(Continued)

FOREIGN PATENT DOCUMENTS

WO    WO2018231070 A1 * 12/2018

OTHER PUBLICATIONS

J.W. Speaker Corp., "J.W. Speaker SmartHeat Series Heated LED Lights," https://www.oemoffhighway.com/electronics/lighting/product/20988241/jw-speaker-corp-jw-speaker-smartheat-series-heated-led-lights, published Jan. 10, 2018, accessed Feb. 25, 2022 (12 pages).

*Primary Examiner* — David Redding
(74) *Attorney, Agent, or Firm* — Mark C. Bach; Umang Khanna

(57) ABSTRACT

A method for reducing obstruction compromising operation of at least one sensor having a portion disposed through skin of a vehicle, the portion having a surface offset from the skin, using an apparatus including a member disposed offset from the surface including a first side having an inner surface and an outer surface that opposes the surface of the portion, and a second side having a second side inner surface and a second side outer surface facing exterior of the vehicle, a space disposed between the second side inner surface and the inner surface, a first port and a second port pneumatically connected with the space, at least one of the first port and the second port pneumatically connected with a source of compressed air on the vehicle, and a vent pneumatically connected with at least one of the first port and the second port, the method comprises activating at least one of the first port and the second port allowing compressed air to flow from the source into the space. The outer surface of the second side is deformed to separate obstruction from the outer surface. Air flow is directed adjacent the outer surface.

4 Claims, 2 Drawing Sheets

(56) References Cited

U.S. PATENT DOCUMENTS

| | | | |
|---|---|---|---|
| 6,010,222 A | 1/2000 | Olson et al. | |
| 7,124,983 B2 | 10/2006 | Chow et al. | |
| 9,538,054 B2 * | 1/2017 | Hayakawa | G03B 17/02 |
| 2013/0187569 A1 | 7/2013 | Chin-Huan | |
| 2021/0179031 A1 * | 6/2021 | Vitanov | H04N 23/811 |

* cited by examiner

PRIOR ART

REDUCING OBSTRUCTION

BACKGROUND

This disclosure relates generally to a method and an apparatus that reduces an obstruction. More specifically, this disclosure relates to a method and an apparatus for reducing obstruction that can compromise operation of a sensor on a vehicle.

Referring to FIG. 1, a vehicle 10 includes at least one sensor 12 that monitors at least one condition relevant to operation of the vehicle 10. The vehicle 10 may be powered by any suitable power source, such as an internal combustion engine, a compression ignition engine, a gravity engine, an electric engine and the like. The vehicle 10 may be controlled by a lifeform, such as a human and the like, either on the vehicle 10 or remote from the vehicle 10, by a robot or autonomously. The vehicle 10 includes at least one computer 14, such as a body controller and the like, that runs routines necessary for operation of the vehicle 10. The at least one sensor 12 is suitably connected, wired or wirelessly, with the at least one computer 14.

The at least one sensor 12 may comprise radar, LiDAR, camera, ultrasound, audio, headlight, any combinations of the foregoing, and the like. The at least one sensor 12 includes a portion 16, shown clearly in FIG. 2, such as an antenna on radar, a laser on LiDAR, a lens on camera, a transducer on ultrasound, a microphone on audio, a lens on a headlight and the like, that is disposed through a skin 18 of the vehicle 10. In this disposition, the portion 16 may be exposed to an environment outside of the vehicle 10.

Often the vehicle 10 travels through many different environmental conditions, such as rain, freezing ran, ice, snow and the like. These environmental conditions may generate obstruction that can collect on the portion 16 of the at least one sensor 12 thereby compromising operation of the at least one sensor 12. Environmental conditions may combine with other things, such as dirt and the like. This combination may further comprise obstruction that can collect on the portion 16 of the at least one sensor 12 thereby compromising operation of the at least one sensor 12.

Compromising operation of the at least one sensor 12 can reduce likelihood of the vehicle 10 operating as intended. Therefore, it is desirable to provide a method and an apparatus for reducing obstruction on the portion 16 of the at least one sensor 12 that can compromise operation of the at least one sensor 12 on a vehicle 10.

SUMMARY

This disclosure relates to embodiments of a method for reducing obstruction compromising operation of at least one sensor having a portion disposed through skin of a vehicle. The portion has a surface offset from the skin. One embodiment of the method includes using an apparatus including a member disposed offset from the surface, the member including a first side having an inner surface and an outer surface that opposes the surface of the portion, and a second side having a second side inner surface and a second side outer surface, the second side outer surface facing exterior of the vehicle, a space disposed between the second side inner surface and the inner surface, a first port and a second port pneumatically connected with the space, at least one of the first port and the second port pneumatically connected with a source of compressed air on the vehicle, and a vent pneumatically connected with at least one of the first port and the second port, the method comprises activating at least one of the first port and the second port to allow compressed air to flow from the source into the space. The outer surface of the second side is deformed with air in the space thereby separating obstruction from the outer surface. Air flow is directed adjacent the outer surface.

DETAILED DESCRIPTION

This disclosure relates generally to a method and an apparatus that reduces an obstruction. More specifically, this disclosure relates to embodiments of a method and embodiments of an apparatus for reducing obstruction that can compromise operation of at least one sensor 12 on a vehicle 10. While embodiments disclosed herein include a particular number of at least one sensor 12, it is to be understood that other embodiments may include any desired number of at least one sensor 12. The at least one sensor 12 may comprise a temperature sensor, a proximity sensor, an accelerometer, an infrared sensor, a pressure sensor, a light sensor, an ultrasonic sensor, an electromagnetic wave wavelength sensor, a gas sensor, a humidity sensor, a position sensor, a magnetic sensor; a tilt sensor, a strain sensor, a weight sensor, an inertia sensor, a Heisenberg sensor, combinations thereof and the like. In some embodiments, the at least one sensor 12 may comprise radar, LiDAR, camera, ultrasound, audio, headlight, proximity, any combinations of the foregoing, and the like. The at least one sensor 12 may have any desired range, any desired sensitivity. In some embodiments, the at least one sensor 12 may include numerous sensors of varying ranges and sensitivities cooperating to provide information to the at least one computer 14.

Figure 1:
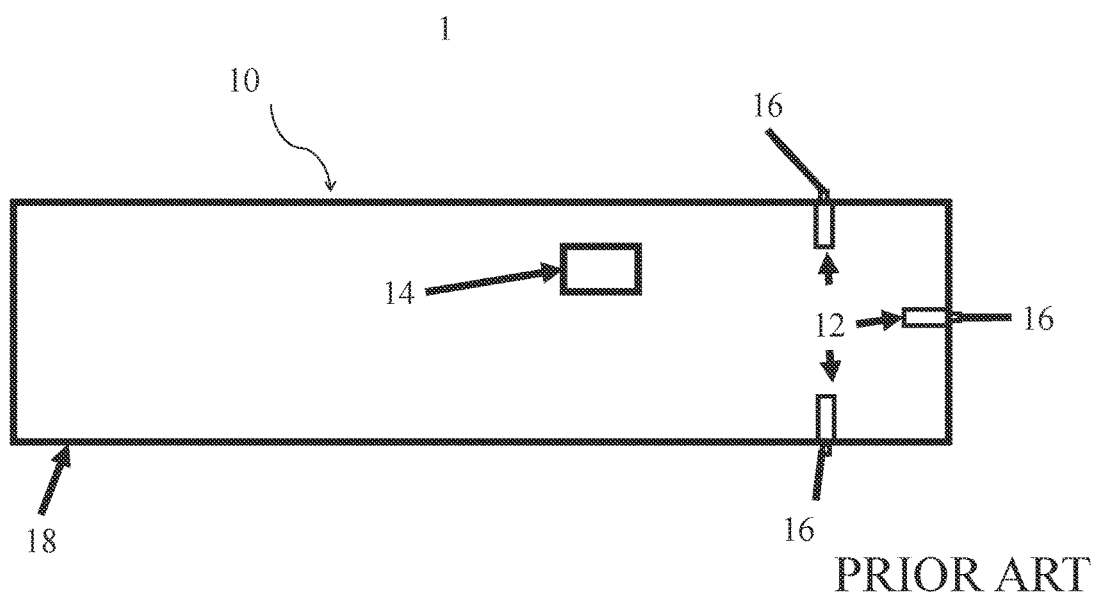
FIG. 1 is a diagram illustrating a vehicle of the prior art.
Figure 2:
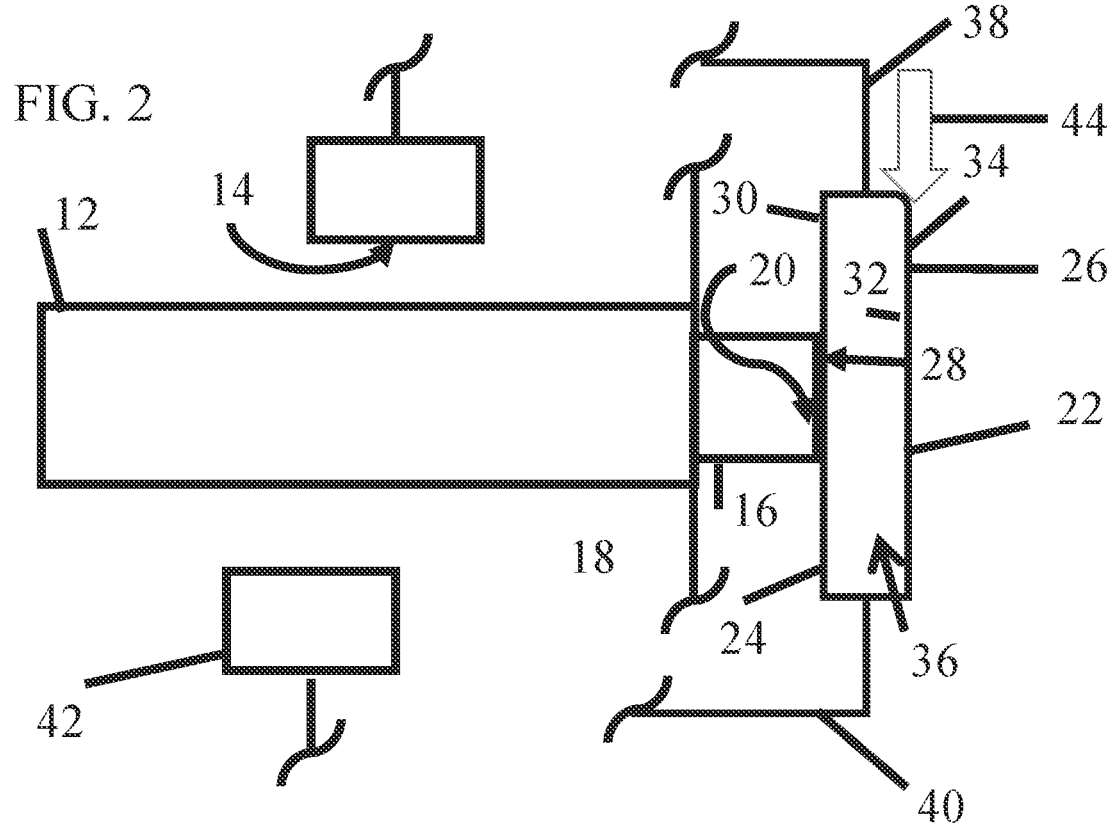
FIG. 2 is a diagram illustrating a vehicle including an embodiment disclosed herein.

The at least one sensor 12 includes a portion 16, shown clearly in FIG. 2, such as an antenna on radar, a laser on LiDAR, a lens on camera, a transducer on ultrasound, a microphone on audio, a lens on a headlight and the like, that is disposed through a skin 18 of the vehicle 10. In this disposition, the portion 16 may be exposed to an environment outside of the vehicle 10. The portion 16 includes a surface 20 offset from the skin 18 of the vehicle 10. A member 22 is disposed offset from the surface 20. Distance between the member 22 and the surface 20 can vary from one embodiment where the member 22 contacts the surface 20 to another embodiment where the member 22 is spaced from the surface 20 by a distance.

The member 22 has a first side 24 having an inner surface 28 and an outer surface 30. The outer surface 30 of the member 22 opposes the surface 20 of the portion 16. The member 22 has a second side 26 having an inner surface 32 and an outer surface 34. The outer surface 34 of the second side 26 faces exterior of the vehicle 10. The member 22 is formed from any suitable material, such as a polymer and the like. At least one of the first side 24 and the second side 26 comprises an expandable material, such as an elastomer and the like. The inner surface 32 of the second side 26 opposes the inner surface 28 of the first side 24 forming a space 36 between the inner surface 32 of the second side 26 and the inner surface 28 of the first side 24. The space 36 is pneumatically connected with a first port 38 and a second port 40 disposed adjacent opposite sides of the space 36. At least one of the first port 38 and the second port 40 are pneumatically connect with a source 42 of compressed air disposed on the vehicle 10. In one embodiment, the source 42 of compressed air comprises compressed air used for an air brake on the vehicle 10. At least one of the first port 38 and the second port 40 is pneumatically connected with a vent that allows reduction of air pressure in the member 22.

With elements of an apparatus for reducing obstruction that can compromise operation of at least one sensor 12 on a vehicle 10 being described, now embodiments of a method for reducing obstruction that can compromise operation of at least one sensor 12 on a vehicle 10 is disclosed. As the vehicle 10 travels, the vehicle 10 encounters various atmospheric conditions, such as humidity, wind, temperature, precipitation and the like. Periodically, atmospheric conditions cause obstruction to form or to be disposed on the outer surface 34 of the second side 26 of the member 22 associated with at least one sensor 12. Presence of obstruction on the outer surface 34 of the second side 26 of the member 22 may be detected by the at least one computer 14 connected, wired or wirelessly, with the at least one sensor 12. By substantially continuously monitoring operation of the at least one sensor 12, the at least one computer 14 can detect change in the at least one sensor 12 that, sometimes determined empirically, indicates presence of obstruction on the outer surface 34 of the second side 26 of the member 22 associated with the at least one sensor 12 that compromises operation of the at least one sensor 12 on the vehicle 10.

To reduce obstruction on the outer surface 34 of the second side 26 of the member 22 associated with the at least one sensor 12, the at least one computer 14 activates at least one of the first port 38 and the second port 40 to allow compressed air to flow from the source 42 of compressed air into the space 36 between the inner surface 32 of the second side 26 and the inner surface 28 of the first side 24 of the member 22. Compressed air in the space 36 deforms or stretches the outer surface 34 of the second side 26 of the member 22 associated with the at least one sensor 12 thereby separating obstruction from the outer surface 34. Illustrating by example, when obstruction comprises ice formed on the outer surface 34. Introduction of compressed air into the space 36 deforms the outer surface 34 that fractures a bond between ice and the outer surface 34 of the second side 26 of the member 22 associated with the at least one sensor 12. Air, flow of which is represented by the arrow 44 in FIG. 2, is directed adjacent the outer surface 34 to encourage removal of obstruction from the outer surface 34 of the second side 26 of the member 22 associated with the at least one sensor 12. This air flow can be produced in many ways, such as by movement of the vehicle 10, a compressed air conveying nozzle appropriately disposed adjacent the outer surface 34 of the second side 26 of the member 22 associated with the at least one sensor 12, and the like. The at least one computer 14 can substantially continuously monitor the at least one sensor 12 to detect at least one of obstruction presence adjacent the outer surface 34 and obstruction removal from the outer surface 34. The at least one computer 14 can control air pressure in the space 36 by appropriately activating at least one of the first port 38 and the second port 40. In some embodiments, the at least one computer 14 can appropriately activate at least one of the first port 38 and the second port 40 to cause pressure state of space 36 to change at rate substantially within the range of 25 Hertz to 150 Hertz.

What is claimed is:

1. A method for reducing obstruction compromising operation of at least one sensor on a vehicle having a skin and at least one computer, the at least one sensor having a portion disposed through the skin, the portion having a surface offset from the skin, an apparatus for reducing obstruction on the at least one sensor including a member disposed offset from the surface, the member including a first side having an inner surface and an outer surface that opposes the surface of the portion, and a second side having a second side inner surface and a second side outer surface, the second side outer surface facing exterior of the vehicle, a space disposed between the second side inner surface and the inner surface, a first port and a second port pneumatically connected with the space, at least one of the first port and the second port pneumatically connected with a source of compressed air on the vehicle, and a vent pneumatically connected with at least one of the first port and the second port, the method comprising the steps of:

activating at least one of the first port and the second port to allow compressed air to flow from the source of compressed air into the space between the inner surface of the second side and the inner surface of the first side of the member;

deforming the outer surface of the second side of the member with compressed air in the space thereby separating obstruction from the outer surface; and directing air adjacent the outer surface to encourage removal of obstruction from the outer surface of the second side of the member associated with the at least one sensor.

2. The method of claim 1 further comprising the step of: the at least one computer continuously monitoring the at least one sensor to determine at least one of obstruction presence adjacent the outer surface and obstruction removal from the outer surface.

3. The method of claim 1 further comprising the step of: the at least one computer controlling air pressure in the space.

4. The method of claim 3 wherein air pressure of the space is changed at rate within the range of 25 Hertz to 150 Hertz.

* * * * *